United States Patent [19]

Sugiyama

[11] Patent Number: 5,173,937
[45] Date of Patent: Dec. 22, 1992

[54] DEVICE FOR RECEIVING MEMORANDUM BOARD FOR TELEPHONE

[75] Inventor: Akira Sugiyama, Hino, Japan

[73] Assignee: Kabushiki Kaisha Toshiba, Kawasaki, Japan

[21] Appl. No.: 666,141

[22] Filed: Mar. 7, 1991

[30] Foreign Application Priority Data

Mar. 9, 1990 [JP] Japan ................... 2-23874[U]

[51] Int. Cl.$^5$ ............................................. H04M 1/00
[52] U.S. Cl. ..................................... 379/441; 379/447
[58] Field of Search ............... 379/110, 434, 435, 436, 379/441, 445, 447, 450, 420; 248/313

[56] References Cited

U.S. PATENT DOCUMENTS

| 4,204,097 | 5/1980 | Schmit | 379/445 |
| 4,790,007 | 12/1988 | Richter et al. | 379/420 |
| 5,033,709 | 7/1991 | Yuen | 248/313 |

FOREIGN PATENT DOCUMENTS

| 0380786 | 8/1990 | European Pat. Off. | 379/441 |
| 2943458 | 5/1981 | Fed. Rep. of Germany | 379/441 |
| 2432805 | 2/1980 | France | 379/447 |

OTHER PUBLICATIONS

Larsson and Wiklund, "Dialog 2000-A New Family of Telephone Sets", Ericsson Review, 1988 #2.

Primary Examiner—Curtis Kuntz
Assistant Examiner—William Cumming
Attorney, Agent, or Firm—Foley & Lardner

[57] ABSTRACT

A device receives a memorandum board for a telephone. The memorandum board includes a handle at the foremost end thereof and is slidably displaced in the forward/rearward direction with the aid of guiding grooves. A pair of engagement holes and a pair of engagement projections are formed on the memorandum board. A pair of first engagment cavities are provided in the bottom of the memorandum board for allowing the engagement projection on the memorandum board to be brought into engagement therewith to hold the memorandum board at the operative position in which the memorandum board is pulled in the forward direction with a user's fingers. A pair of second engagement cavities are provided in the bottom of the telephone for allowing the engagement projections on the memorandum board to be brought into engagement therewith to hold the memorandum board at the intermediate position where the memorandum board is immediately received in the region below the bottom plate of the telephone while the handle is still exposed to the outside and a pair of stoppers for allowing the engagement holes on the memorandum board to be brought into engagement therewith to hold the memorandum board at the inoperative position where the whole memorandum board, inclusive of the handle, is fully received in the region below the bottom plate of the telephone.

4 Claims, 6 Drawing Sheets

DEVICE FOR RECEIVING MEMORANDUM BOARD FOR TELEPHONE

BACKGROUND OF THE INVENTION

1. Field of the Invention

The present invention relates generally to a device for receiving a memorandum board for a telephone. More particularly, the present invention relates to a device for receiving a memorandum board on which a plurality of data such as telephone numbers or the like are noted by writing or an equivalent operation so as to allow a telephone to be readily used by a user such that the whole memorandum board including a handle can entirely be received in the region below the bottom surface of the telephone with the user's fingers.

2. Description of the Related Art

Generally, a telephone is provided with a memorandum board which can slidably move in the forward-/rearward direction along guide grooves in the region below the bottom surface of the telephone. The memorandum board is firmly held at one of two positions, i.e., an operative position in which a display surface of the memorandum board is pulled forward of the bottom surface of the telephone so as to allow a plurality of data such as telephone numbers or the like to be visually recognized by a user and an inoperative position in which the display surface is received in the region below the bottom surface of the telephone while a handle projecting outward of the memorandum board is still exposed to the outside.

To facilitate understanding of the present invention, a typical conventional device for receiving a memorandum board for a telephone will briefly be described below with reference to FIG. 8 to FIG. 11.

Figure 8:
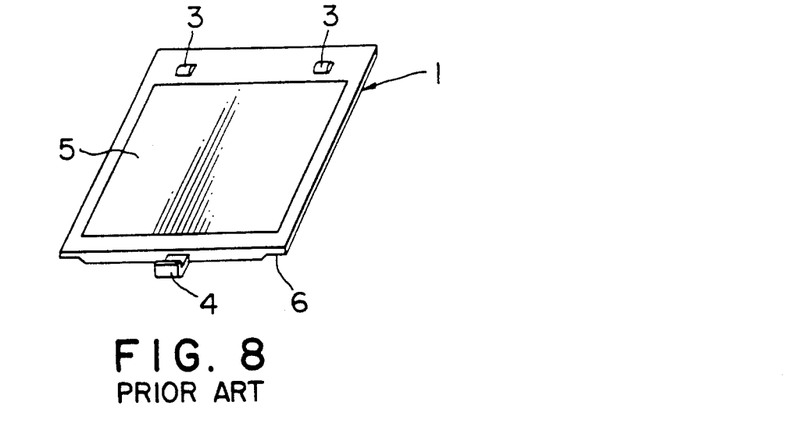
FIG. 8 is a perspective view which shows a memorandum board employed for a conventional device for receiving the memorandum board for a telephone.

FIG. 8 is a perspective view of a memorandum board employable for the conventional device. The memorandum board, designated by reference numeral 1, includes two engagement projections 3 in the vicinity of the rear end thereof. In addition, the memorandum board 1 includes a handle 4 at the foremost end thereof so as to allow the memorandum board 1 to be pulled forward of the telephone 2 by the user's fingers. A display surface 5 having a plurality of data such as telephone numbers or the like noted thereon is arranged in the region between the engagement projections 3 and the handle 4. Further, the memorandum board 1 includes on both sides thereof guide portions 6 the thickness of each of which is dimensioned less than a thickness of the memorandum board 1.

Figure 9:
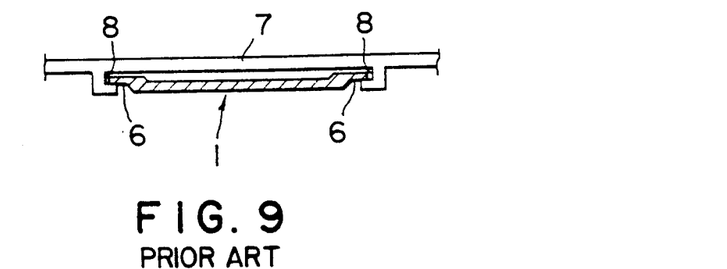
FIG. 9 is a sectional side view of the conventional device, particularly illustrating the engaged state of the memorandum board relative to the bottom plate of the telephone.

FIG. 9 is a sectional view of the conventional device which illustrates that the memorandum board 1 slides in a plane which contacts a bottom plate 7 of the telephone 2. The bottom plate 7 is formed with a pair of guide grooves 8 so as to allow the guide portions 6 of the memorandum board 1 to slidably move along the guide grooves 8.

Figure 10:
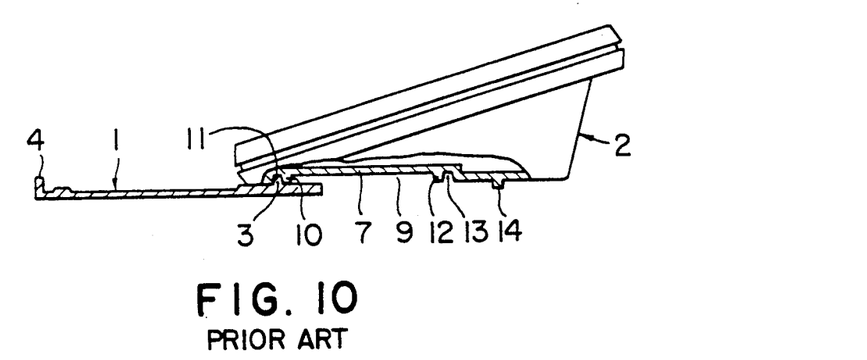
FIG. 10 is a sectional side view of the conventional device which illustrates that the memorandum board is fully pulled in the forward direction.

FIG. 10 is a sectional side view of the conventional device. As is apparent from the drawing, a recessed portion 9 is formed on the lower surface of the bottom plate 7. In addition, a first engagement groove 11, adapted to be engaged with an engagement projection 3 on the memorandom 1, is formed on the bottom surface of the telephone 2 in the vicinity of the fore end of the recessed portion 9. The first engagement groove 11 serves to hold the memorandum board 1 in the operative state wherein the memorandum board 1 is pulled in the forward direction with a user's fingers, when engagement groove II is engaged with the engagement projection 3. Additionally, a second engagement groove 13 is formed on the bottom surface of the telephone 2 in the vicinity of the rear end of the recessed portion 9. The second engagement groove 13 serves to hold the memorandum board 1 in the intermediate state wherein the memorandum board 1 is intermediately received in the region below the bottom plate 7 of the telephone 2 while the handle 4 is still exposed to movement of the board 1 to a position in which outside. Further, a projection 14 for restricting the memorandum board 1 is received in the region below the bottom surface of the telephone 2 is formed on a bottom plate 7 of the telephone 2 at the position behind the second engagement groove 13. When the memorandum board 1 is received in the region below the bottom plate 7 of the telephone 2 in the intermediate state, the fore end of the memorandum board 1 comes in contact with the projection 14 for the purpose of positional restriction.

While the memorandum board 1 is pulled in the forward direction with user's fingers, the projection 3 is brought into engagement with the first engagement groove 11, whereby the memorandum board 1 is firmly held in the operative state.

Figure 11:
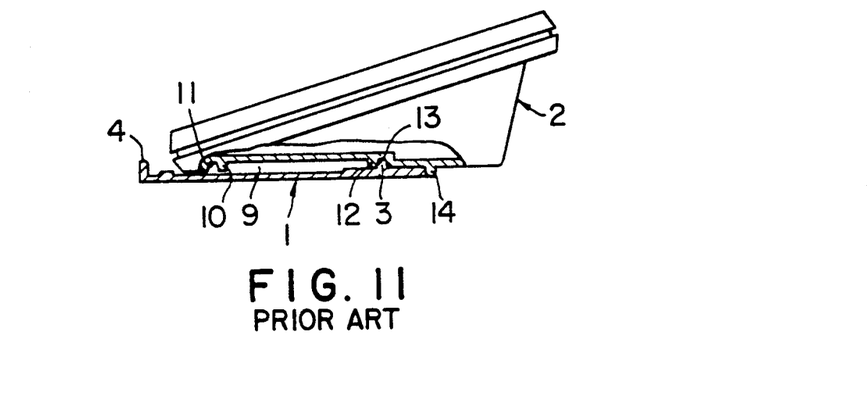
FIG. 11 is a sectional side view of the conventional device which illustrates that the memorandum board is fully received in the interior of the device while a handle is exposed to the outside.

FIG. 11 is a sectional side view of the conventional device which illustrates that the memorandum board 1 is intermediately received in the region below the bottom plate 7 of the telephone 2. While the memorandum board 1 is received in the intermediate state in that way, the rear end of the memorandum board 1 comes in contact with the projection 14. This prevents the memorandum board 1 from being excessively displaced in the region below the bottom plate 7 of the telephone 2. At this time, the engagement projection 3 on the memorandum board 1 is brought in engagement with the second engagement groove 13. This prevents the memorandum board 1 from being undesirably disengaged from the telephone 2 due to falling-down of the memorandum board 1.

However, it has been found that the conventional device constructed in the above-described manner has a problem that the handle is damaged or broken not only during normal usage but also during a packing operation, a transporting operation, or the like, since the handle is still projected outward of the telephone when the memorandum board is received in the region below the bottom plate of the telephone in the inoperative state. Another problem is that a packing container required for transportation is dimensioned larger than a size set to a space required for transportation of the telephone only, resulting in a space required for transportation and a transportation cost being increased substantially. If the telephone and the memorandum board are separately packed, this leads to another problem that a packing operation is unavoidably performed in a complicated manner.

SUMMARY OF THE INVENTION

The present invention has been made with the foregoing background in mind.

An object of the present invention is to provide a device for receiving a memorandum board for a telephone wherein the whole memorandum board, inclusive of a handle projecting outward of the telephone, can entirely be received in the region below the bottom surface of the telephone by pushing the fore end part of the memorandum board further rearward with a user's fingers.

Other object of the present invention is to provide a device for receiving a memorandum board for a telephone wherein the telephone can easily be transported with a minimized transportation space while the memorandum board is entirely received in the region below the bottom surface of the telephone.

Another object of the present invention is to provide a device for receiving a memorandum board for a telephone wherein there does not exists a possibility that a handle is damaged or broken due to a user's careless handling, falling-down or the like malfunction.

To accomplish the above objects, the present invention provides a device for receiving a memorandum board for a telephone wherein the memorandum board includes a handle in the form of projection projecting from the memorandum board at the foremost end thereof and it is slidably displaced in the forward/rearward direction along a pair of guide grooves formed on the bottom plate of the telephone, wherein the device includes a pair of engagement holes formed on the memorandum board in the vicinity of the rear end of the memorandum board, a pair of engagement projections projecting on the memorandum board in the vicinity of the rear end of the memorandum board, the engagement projections being located sideward of the engagement holes, a pair of first engagement cavities formed on the bottom plate of the telephone so as to allow the engagement projections on the memorandum board to be brought into engagement with the first engagement cavities, thereby to hold the memorandum board in the operative state wherein the memorandum board is pulled in the forward direction with user's fingers, a pair of second engagement cavities formed on the bottom plate of the telephone so as to allow the engagement projections on the memorandum board to be brought into engagement with the second engagement cavities, thereby to hold the memorandum board in the intermediate state wherein the memorandum plate is intermediately received in the region below the bottom surface of the telephone while the handle is still exposed to the outside, and a pair of stoppers projecting on the bottom plate of the telephone so as to allow the engagement holes on the memorandum board to be brought in engagement with the stoppers in the inoperative state wherein the whole memorandum board inclusive of the handle is fully received in the region below the bottom surface of the telephone.

According to the present invention, when the fore end of the memorandum board, held in the intermediate state, is pushed further with a user's fingers, the rear end of the memorandum board climbs over the stopper on the bottom plate of the telephone. This causes the memorandum board to be fully received in the region below the bottom surface of the telephone. At this time, the engagement holes on the memorandum board at the rear end part of the same are brought into engagement with the stoppers on the bottom plate of the telephone. Consequently, the whole memorandum board inclusive of the handle is entirely received in the region below the bottom surface of the telephone without any possibility that the memorandum board is undesirably disengaged from the telephone and falls down on a floor or the like.

In addition, since the present invention makes it possible to entirely positive the whole memorandum board, inclusive of the handle, in the region below the bottom surface of the telephone by pushing the foremost end of the memorandum board held in the intermediate state further, a user can easily transport the telephone with a minimized transportation space for the purpose of relocation. Moreover, he can handle the telephone easily.

When the memorandum board is not practically used for a long period of time, it is recommended that the whole memorandum board inclusive of the handle be fully received in the region below the bottom surface of the telephone. This is because there does not arise a possibility that the handle is damaged or broken due to falling-down of the telephone or a similar malfunction.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which:

FIG. 4(a) and FIG. 4(b) are perspective views, respectively, wherein

DESCRIPTION OF THE PREFERRED EMBODIMENT

Now, the present invention will be described in detail hereinafter with reference to the accompanying drawings which illustrate a device for receiving a memorandum board for a telephone in accordance with an embodiment of the present invention.

Figures 1, 2:
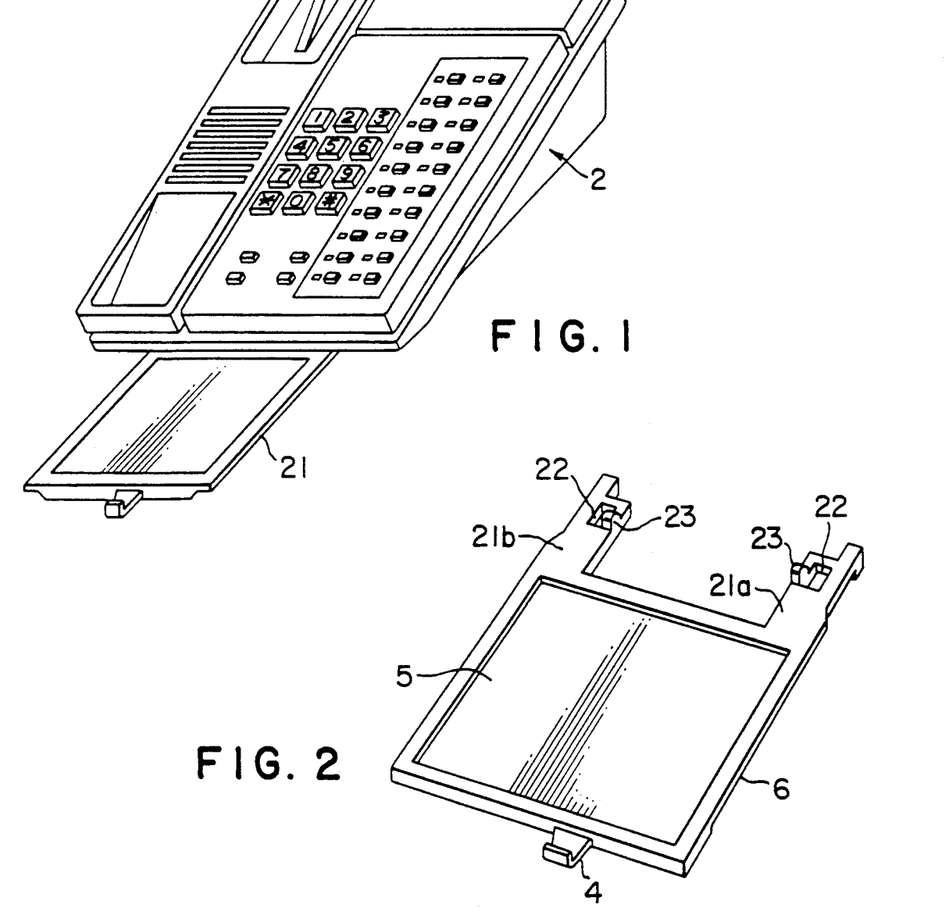
FIG. 1 is a perspective view which shows the whole assembly of a telephone and a memorandum board.
FIG. 2 is a perspective view which shows the memorandum board employable for a device for receiving the memorandum board for a telephone in accordance with an embodiment of the present invention.

FIG. 1 is a perspective view which illustrates that a memorandum board 21 is slidably received in the region below the bottom surface of a telephone 2 to move in the forward/rearward direction. FIG. 2 is a perspective view which shows the upper surface of the memorandum board 21. As is apparent from the drawing, the memorandum board 21 includes a pair of extensions 21a and 21b on both sides at the rear end part thereof. Each of the extensions 21a and 21b is formed with a substantially square engagement hole 22, and a trapezoidal projection 23 projects upward of each of a extensions 21a and 21b at the position located inside of the engagement hole 22. In addition, the memorandum board 21 includes a handle 4 at the foremost end thereof and a display surface 5 which extends in the region between the handle 4 and the extensions 21a and 21b so as to allow a plurality of data such as telephone numbers or the like to be noted on the display surface 5 to be visually recognized by a user.

Figure 4A:
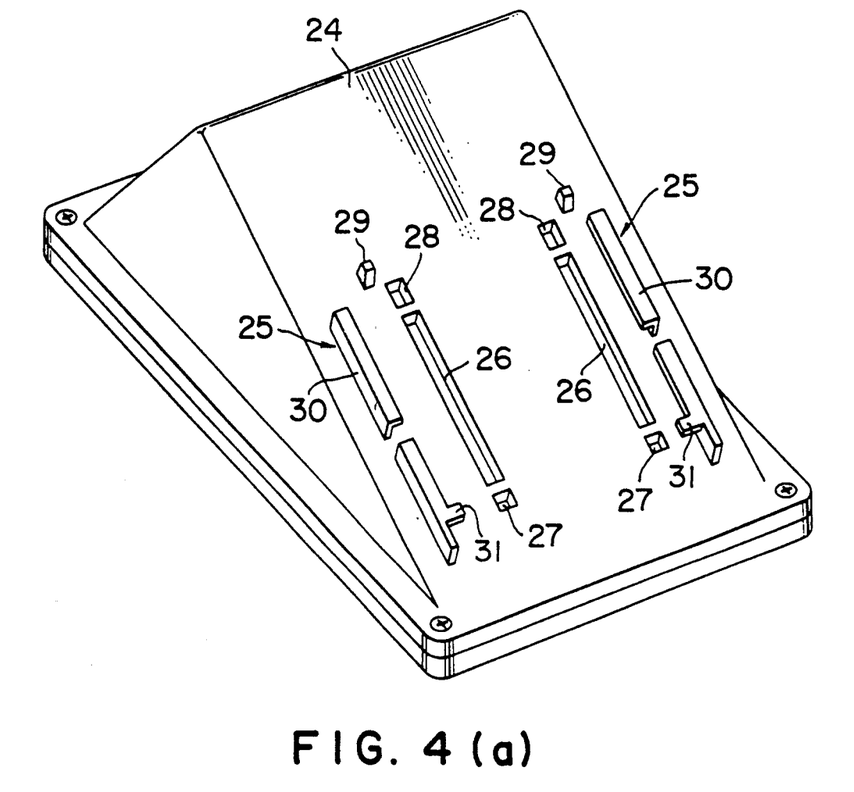
FIG. 4(a) shows the configuration of a bottom plate of the telephone and FIG. 4(b) shows the configuration of the memorandum board.
Figure 4B:
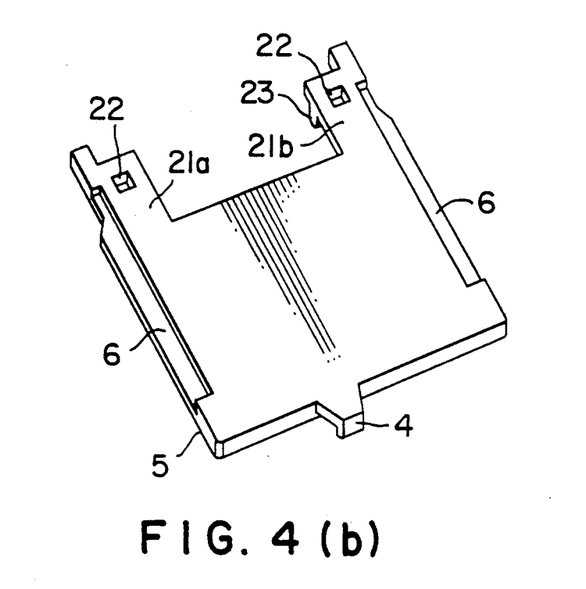

FIG. 4(b) is a perspective view which shows the bottom surface of memorandum board 21. As shown in the drawing, the memorandum board 21 includes a pair of guide portions 6 along the opposite edges of each of which the thickness is dimensioned less than a thickness of the remainder of the memorandum board 21.

FIG. 4(a) is a perspective view which shows a bottom surface 24 of the telephone 2. As shown in the drawing, a pair of guiding means 25 are symmetrically arranged on both sides of the bottom surface 24 of the memorandum board 21. Since both guiding means 25 are identical to each other in structure, one of them will be described below for the purpose of simplification of explanation.

The guiding means 25 includes a longitudinally extending inner guide groove 26 which is located inside of an outer guide member 30 to be described later. In addition, the guiding means 25 includes a first engagement cavity 27 and a second engagement cavity 28 in the vicinity of the opposite ends of the inner guide groove 26. Further, the guiding means 25 includes a trapezoidal stopper 29 in the form of a projection on the bottom surface 24, and the trapezoidal stopper 29 is located sideward of the second engagement cavity 28.

An outer guide member 30 is arranged outside of the inner guide groove 26 with a certain distance therebetween. As is best seen in FIG. 4(a), the outer guide member 30 is designed in an inverted L-shaped sectional configuration and includes a pawl 31 in vicinity of the one end thereof for the purpose of preventing the memorandum board 21 from being disengaged from the guide means 25. Slidable movement of the guide portions 6 on the memorandum board 21 is properly guided along the inner wall surfaces of the outer guide members 30.

Figure 3:
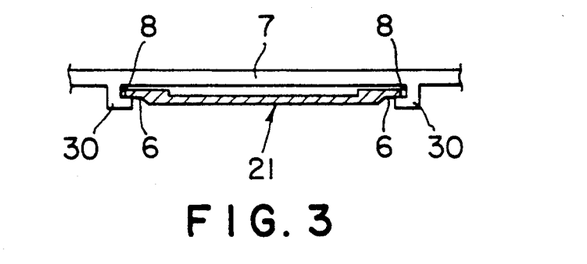
FIG. 3 is a sectional view of the device which illustrates that the memorandum board is received in the region below the bottom plate of the telephone.

FIG. 3 is a sectional view which illustrates that the guide portions 6 are engaged with the pair of outer guide members 30. As is apparent from the drawing, the memorandum board 21 can slidably be displaced in the forward/rearward direction along guide grooves 8 of the outer guide members 30 with a user's fingers. At this moment, the engagement projections 23 on the memorandum board 21 can likewise slidably be displaced along the inner guide grooves 26.

It should be noted that a specific feature of the device of the present invention consists in that the memorandum board 21 is held in the engaged state at one of three positions, one of them being an operative position in which the display surface 5 of the memorandum board 21 is fully pulled in the forward direction with a user's fingers, another one being an intermediate position in which the memorandum board 21 is intermediately received in the region below the bottom surface 24 of the telephone 2 while the handle 4 is still exposed to the outside and another one being an inoperative position in which the memorandum board 21 is fully received in the region below the bottom surface 24 of the telephone 2.

Figure 5A:
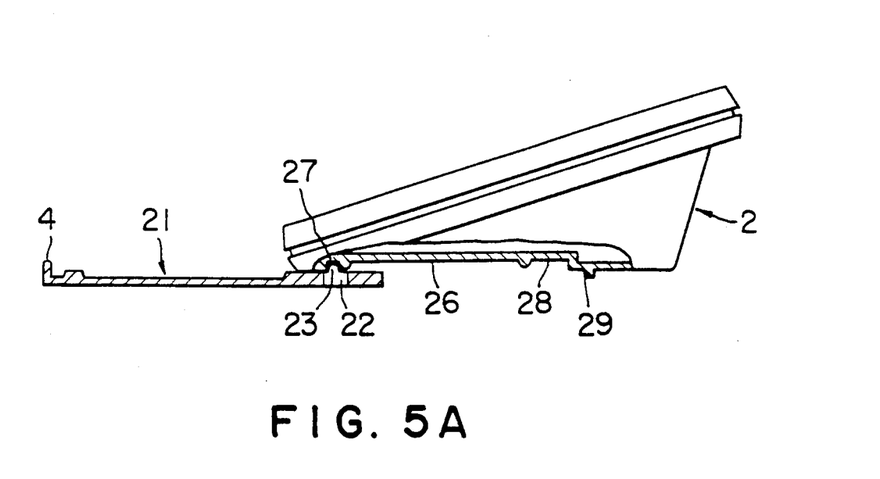
FIG. 5A is a sectional side view of the device which illustrates that the memorandum board is held in the operative state wherein the memorandum board is fully pulled in the forward direction with a user's fingers.
Figure 5B:
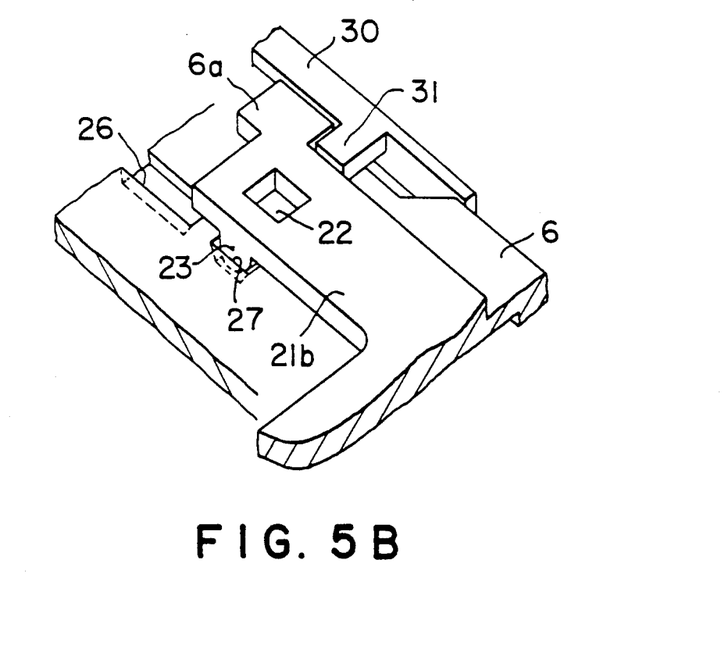
FIG. 5B is a fragmentary perspective view of the device in the operative state, particularly illustrating the engaged state of the memorandum board relative to the bottom plate of the telephone.

FIG. 5A and FIG. 5B show that the memorandum board 21 has been pulled in the forward direction, FIG. 5A is a sectional side view of the device, and FIG. 5B is a fragmentary perspective view of the device. At this time, the engagement projections 23 on the memorandum board 21 are brought into engagement with the first engagement cavities 27, and projections 6a at the rear ends of the guide portions 6 are engaged with the pawls 31, whereby the operative position of the memorandum board 21 is unchangeably maintained while preventing the memorandum board 21 from being disengaged from the device.

Figure 6A:
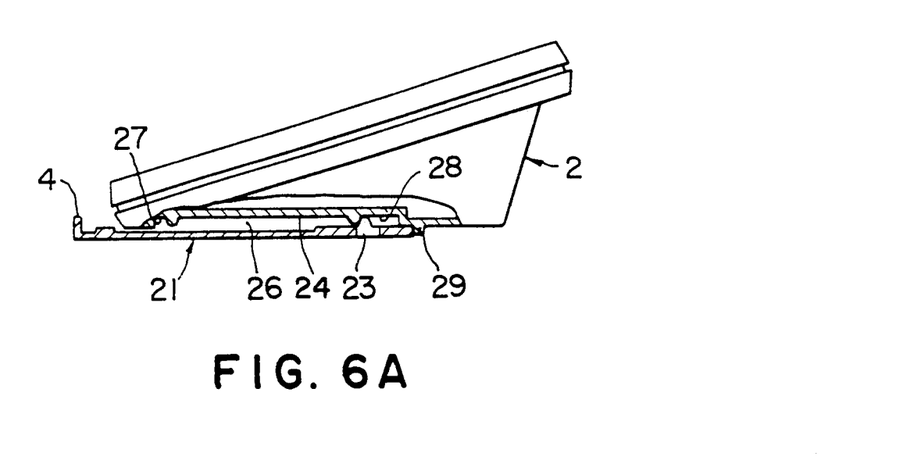
FIG. 6A is a sectional side view of the device which illustrates that the memorandum board is held in the intermediate state wherein the memorandum board is intermediately received in the region below the bottom surface of the telephone with the handle continuing to 6C exposed to the outside.
Figure 6B:
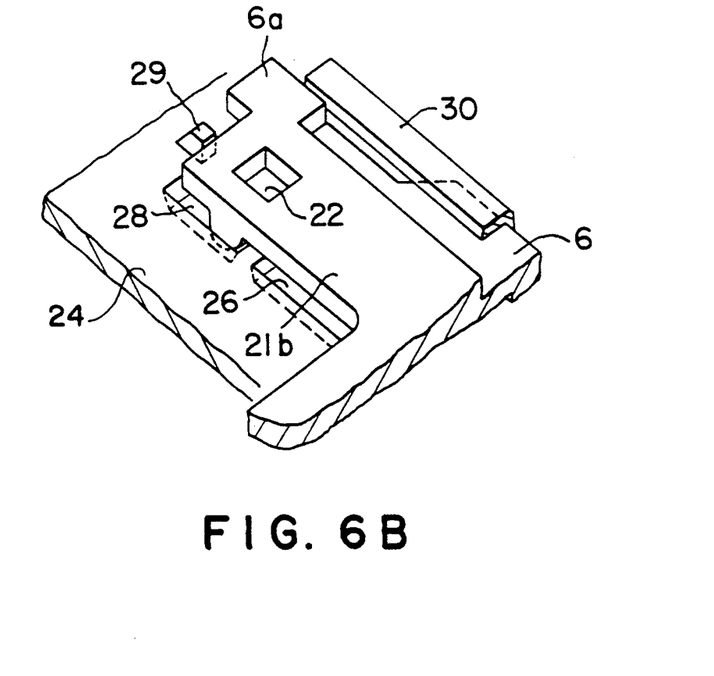
FIG. 6B is a fragmentary perspective view of the device in the intermediate state, particularly illustrating the engaged state of the memorandum board relative to the bottom plate of the telephone.

FIG. 6A and FIG. 6B show the intermediate position of the memorandum board in which only the handle 4 is projected outward of the fore end of the telephone and the remaining part of the memorandum board 21 is received in the region below the bottom surface 24 of the telephone 2, respectively. While the intermediate position is maintained in that way, the projections 23 on the memorandum board 21 are brought into engagement with the second engagement cavities 23 while preventing the memorandum board 21 from being pulled forwardly from the intermediate position. At this time, the rear ends of the extensions 21a and 21b from the memorandum board 21 come into contact with the stoppers 29. This prevents the memorandum board 21 from being displaced from the intermediate position further in the rearward direction.

Figure 7A:
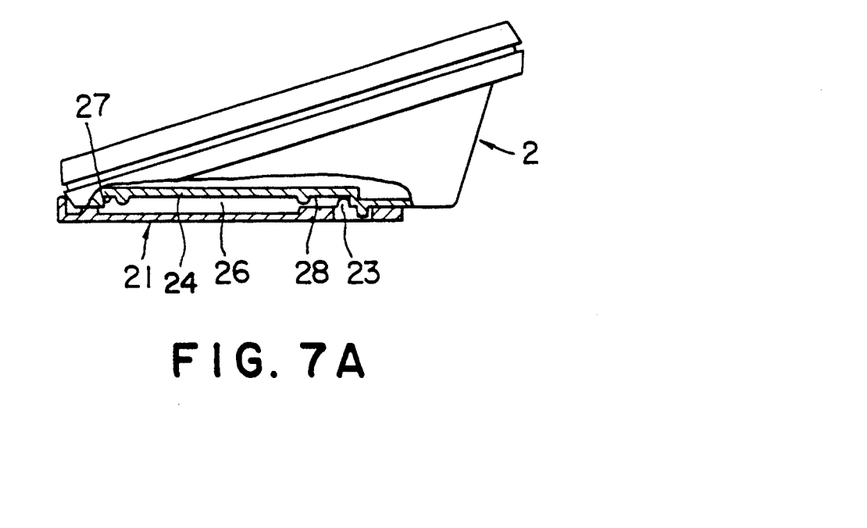
FIG. 7A is a sectional side view of the device which illustrates that the memorandum board is held in the inoperative state wherein the memorandum board is fully received in the region below the bottom surface of the telephone.
Figure 7B:
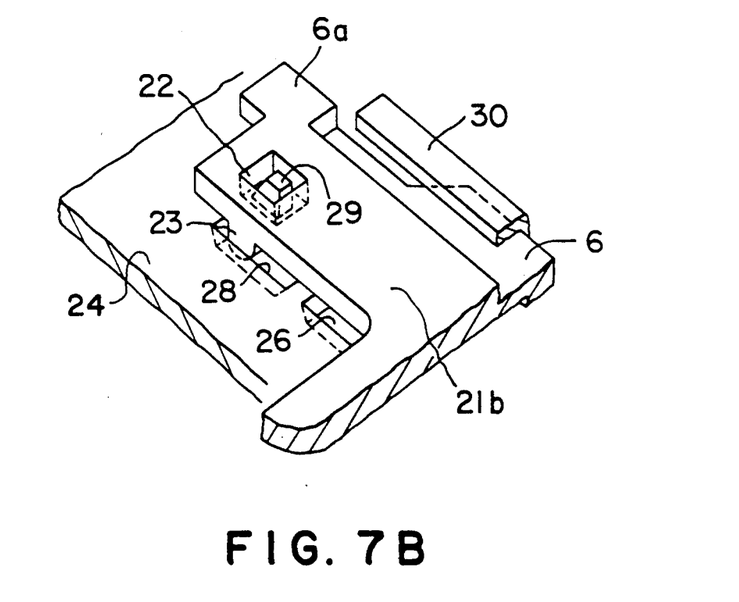
FIG. 7B is a fragmentary perspective view of the device in the inoperative state, particularly illustrating the engaged state of the memorandum board relative to the bottom plate of the telephone.

FIG. 7A and FIG. 7B show the inoperative position of the memorandum board 21 in which the memorandum board 21 is entirely received in the region below the bottom surface 24 of the telephone 2. To reach the inoperative position, a user is required to push the fore end part of the memorandum board 21 in the rearward direction with his fingers while holding the telephone with his other hand. As the memorandum board 21 is displaced in the rearward direction in that way, the rear ends of the extensions 21a and 21b from the memorandum board 21 climb over the stoppers 29 on the bottom surface 24 of the telephone 2, whereby the memorandum board 21 is fully received in the region below the bottom surface 24 of the telephone 2. As a result, the stoppers 29 on the bottom plate 7 of the telephone are brought into engagement with the engagement holes 22 which are formed at the rear end of the memorandum board 21. The engagement of the stoppers 29 with the engagement holes 22 reliably prevents the memorandum board 21 from being undesirably disengaged from the aforementioned inoperative position.

While the present invention has been described above with respect to a single preferred embodiment, it should of course be understood that the present invention should not be limited only to this but that various changes or modifications may be made without departure from the scope of the invention as defined by the appended claims.

What is claimed is:

1. In a device for receiving a memorandum board for a telephone wherein said memorandum board includes a handle in the form of a projection projecting therefrom at the foremost end thereof and is slidably displaced in the forward/rearward direction along a pair of guide grooves formed on a bottom plate of the telephone, the improvement comprising:

a pair of engagement holes formed on the memorandum board in the vicinity of the rear end of the memorandum board, a pair of engagement projections projecting from the memorandum board in the vicinity of the rear end of the memorandum board, said engagement projections being located sideward of said engagement holes, a pair of first engagement cavities formed on the bottom plate of the telephone so as to allow said engagement projections on the memorandum board to be brought into engagement with said first engagement cavities thereby to hold the memorandum board in the operative state wherein the memorandum board is pulled in the forward direction with a user's fingers, a pair of second engagement cavities formed on the bottom plate of the telephone so as to allow said engagement projections on the memorandum board to be brought into engagement with said second engagement cavities thereby to hold the memorandum board in the intermediate state wherein the memorandum board is intermediately received in the region below the bottom plate of the telephone while the handle is still exposed to the outside, and a pair of stoppers projecting on the bottom plate of the telephone so as to allow said engagement holes on the memorandum board to be brought into engagement with said stoppers in the inoperative state wherein the whole memorandum board, inclusive of the handle, is fully received in the region below the bottom plate of the telephone.

2. The device as claimed in claim 1, wherein the memorandum board includes a pair of extensions which extend from the rear end of a display portion on both sides of the memorandum board, said engagement holes and said engagement projections on the memorandum board being formed on said extensions.

3. The device as claimed in claim 1, wherein a pair of inner guide grooves are formed on the bottom plate of the telephone while extending along straight lines between said first engagement cavities and said second engagement cavities.

4. The device as claimed in claim 1, wherein said stoppers are formed on the bottom plate of the telephone in the vicinity of said first engagement cavities.

* * * * *